US009970288B2

(12) United States Patent
Zheng et al.

(10) Patent No.: US 9,970,288 B2
(45) Date of Patent: May 15, 2018

(54) RECEIVING APPARATUS FOR DOWNHOLE NEAR-BIT WIRELESS TRANSMISSION

(71) Applicant: Institute of Geology and Geophysics, Chinese Academy of Sciences, Beijing (CN)

(72) Inventors: Jian Zheng, Beijing (CN); Qingyun Di, Beijing (CN); Wenxuan Chen, Beijing (CN); Yuntao Sun, Beijing (CN); Wenxiu Zhang, Beijing (CN); Yongyou Yang, Beijing (CN)

(73) Assignee: INSTITUTE OF GEOLOGY AND GEOPHYSICS, CHINESE ACADEMY OF SCIENCE, Beijing (CN)

( * ) Notice: Subject to any disclaimer, the term of this patent is extended or adjusted under 35 U.S.C. 154(b) by 0 days. days.

(21) Appl. No.: 15/692,776

(22) Filed: Aug. 31, 2017

(65) Prior Publication Data

US 2018/0058200 A1  Mar. 1, 2018

(30) Foreign Application Priority Data

Aug. 31, 2016  (CH) .......................... 2016 1 0799298

(51) Int. Cl.
*E21B 47/12* (2012.01)
*G01V 3/34* (2006.01)
(Continued)

(52) U.S. Cl.
CPC .......... *E21B 47/122* (2013.01); *E21B 17/028* (2013.01); *E21B 47/16* (2013.01); *G01V 3/34* (2013.01)

(58) Field of Classification Search
CPC ...... E21B 47/122; E21B 17/028; E21B 47/16; G01V 3/34
See application file for complete search history.

(56) References Cited

U.S. PATENT DOCUMENTS 7,096,313 B1   8/2006  Chang et al.
7,762,854 B1   7/2010  Peng
(Continued)

FOREIGN PATENT DOCUMENTS

CN   1740746 A   3/2006
CN   2849164 Y   12/2006
(Continued)

*Primary Examiner* — Sisay Yacob
(74) *Attorney, Agent, or Firm* — Novick, Kim & Lee, PLLC; Allen Xue

(57) ABSTRACT

A receiving apparatus for downhole near-bit wireless transmission emission includes an electrical isolation drill collar and an internal electrical isolation short tube. The insulating subs are serially connected and disposed in the middle of the electrical isolation drill collar and the internal electrical isolation sub to realize electric isolation. The electrical isolation drill collar is electrically coupled with the internal electrical isolation short tube through a lantern stabilizer. The receiving apparatus further includes a wireless transmission receiving unit. The electrical isolation drill collar and the internal electrical isolation short tube of the receiving apparatus both have an electrical isolation function. The insulating subs in the electrical isolation drill collar and the internal electrical isolation short tube are non-detachable, and can meet downhole requirements for high torsion and high-pressure sealing property.

8 Claims, 2 Drawing Sheets

(51) Int. Cl.
*E21B 47/16* (2006.01)
*E21B 17/02* (2006.01)

(56) References Cited

U.S. PATENT DOCUMENTS

| | | | |
|---|---|---|---|
| 2001/0012703 A1* | 8/2001 | Wurm | E21B 3/02 439/32 |
| 2002/0075114 A1 | 6/2002 | Hall et al. | |
| 2007/0247329 A1* | 10/2007 | Petrovic | G01V 11/002 340/854.4 |
| 2009/0023502 A1 | 1/2009 | Koger | |
| 2009/0153355 A1* | 6/2009 | Price | E21B 17/028 340/854.6 |
| 2012/0249338 A1* | 10/2012 | Merino | H04B 11/00 340/854.6 |
| 2012/0299743 A1* | 11/2012 | Price | E21B 17/028 340/854.6 |
| 2014/0332235 A1 | 11/2014 | Mueller et al. | |

FOREIGN PATENT DOCUMENTS

| | | |
|---|---|---|
| CN | 101289935 A | 10/2008 |
| CN | 201221354 Y | 4/2009 |
| CN | 101493008 A | 7/2009 |
| CN | 102418516 A | 4/2012 |
| CN | 202187758 U | 4/2012 |
| CN | 103061755 A | 4/2013 |
| CN | 103577121 A | 2/2014 |
| CN | 204283400 U | 4/2015 |
| CN | 204283413 U | 4/2015 |
| CN | 105353357 A | 2/2016 |
| CN | 105760113 A | 7/2016 |
| CN | 105804722 A | 7/2016 |
| CN | 206299372 U | 7/2017 |
| CN | 206299375 U | 7/2017 |

* cited by examiner

RECEIVING APPARATUS FOR DOWNHOLE NEAR-BIT WIRELESS TRANSMISSION

TECHNICAL FIELD

The present invention mainly belongs to the technical field of oil and gas exploration, and particularly relates to a receiving apparatus for downhole near-bit wireless transmission.

BACKGROUND

In recent years, using horizontal wells to improve reservoir-encountered rate and recovery ratio of oil and gas reservoirs has been widely applied in various oil fields. A near-bit geology-oriented drilling system has characteristics of determining properties of strata in real time, exploring to-be-drilled strata in advance, implementing accurate orientation, and the like, which helps to improve discovery rate of exploratory wells, reservoir-encountered rate of development wells and recovery ratio of oil and gas fields.

A near-bit wellbore drift angle measurement instrument is usually to package a near-bit wellbore drift angle sensor at the front end of a deflection tool (downhole mud motor), transmit data into a conventional wireless measurement while drilling (LWD/MWD) instrument positioned at the upper part of the deflection tool (downhole mud motor) by means of a wired or wireless transmission (ultrasonic wave, electromagnetic wave, etc.), after that transmit the signals to the surface by means of a wireless transmission manner such as mud pulse telemetry or electromagnetic wave, together with the data measured by the conventional wireless measurement while drilling instrument.

Real-time acquisition of the near-bit well deflection parameter and gamma measurement helps field drilling engineer to control the drilling trajectory of the bit and geologic parameters in drilling process, thereby improving the oil drilling and production rate. However, how to transmit parameters measured near the bit to the ground becomes the key to the development of the technology.

At present, most of domestic researches focus on transmitting the parameters measured near the bit by means of a cable embedded in the mud motor (e.g., a screw-type mud motor), an acoustic wave wireless transmission manner, a coil type electromagnetic wave wireless transmission manner, and the like.

The cable buried in the mud motor belongs to a wired transmission structure: near-bit stratum information measured by a sensor within a measurement sub is transmitted to the MWD system through a wire or cable, and a cable channel is established between the near-bit measurement sub and a receiving sub. However, these "cables" are embedded in each mechanical part between the measurement sub and the MWD system, and a wired channel is established, that is, there are needs for pre-burying cables in downhole drilling tools such as the measurement sub, a receiving sub and a mud motor, for a special screw motor to be suitable for signal transmission, and for solving problems of high-pressure sealing and reliable electrical connection of thread interfacing positions, resulting in low applicability.

Compared with the wired transmission manner, a wireless transmission method is lower in overall cost and better in versatility, and can be used in downhole small-data-volume transmission since there is no need for largely changing a structure of the downhole drilling tool in a manner of upwards transmitting the parameters measured near the bit. However, in an existing wireless transmission technology, there are still the following shortcomings.

The coil type electromagnetic wave wireless transmission is as follows: electromagnetic wave transmission adopts an electromagnetic wave transmitting apparatus and an electromagnetic wave receiving apparatus. That is, coils for transmitting and receiving electromagnetic wave are respectively wound on independent drill collars, and then covered with an insulating material for protection, so that a wireless transmission apparatus is formed. Such a transmission manner is higher in requirements for resistivity values of strata. Furthermore, as a signal is received depending on the coils on the outer wall of the drill collar, when the signal is transmitted to the ground through MWD, it is necessary to solve a data communication problem between the MWD in a nozzle and the receiving coil on the outer wall of the drill collar. That is, a special structure is designed to perform data connection, which reduces the retrievability of the MWD system.

The acoustic wave wireless transmission is as follows: the acoustic wave wireless transmission manner is to respectively install a transmitting transducer and a receiving transducer at a transmitting sub and a receiving sub of the drill collar, and signals are transmitted by means of acoustic characteristics of the transmitting transducer and the receiving transducer. However, a design of the transducers makes a mechanical structure of the near-bit transmitting sub be very complicated, and increases the length of the near-bit transmitting sub. Furthermore, the acoustic wave transmission cannot meet a requirement for an across-mud motor transmission distance (about 10 meters) as well because of the strong noise produced near the bit. Since an acoustic wave receiving apparatus receives the signal by installing a receiving transducer on the outer wall, it is also necessary to solve a communication problem between the structure transducer on the outer wall and the MWD in the nozzle, which reduces the retrievability of the MWD system.

SUMMARY

In view of the above-mentioned problems, the present disclosure provides a mechanical apparatus suitable for downhole near-bit wireless transmission and reception. The apparatus has an electrical isolation drill collar and an internal electrical isolation short tube of the receiving apparatus. Both have an electrical isolation function; insulating subs in the electrical isolation drill collar and the internal electrical isolation short tube are non-detachable and can meet downhole requirements for high torque and high-pressure sealing property. Further, the receiving unit structure of a probe type structure and an electrical connection structure of a lantern stabilizer do not affect the retrievability of a lower seat key type MWD system.

The present discloses a receiving apparatus suitable for downhole near-bit wireless transmission. It includes an electrical isolation drill collar and an internal electrical isolation short tube. Insulating subs are serially connected and disposed in the middles of the electrical isolation drill collar and the internal electrical isolation sub to realize electric isolation, the insulating subs separate the receiving apparatus into a receiving positive pole and a receiving negative pole which are electrically isolated; one end close to the MWD system is the receiving positive pole and one end close to a mud motor is the receiving negative pole.

The receiving apparatus further includes a wireless transmission receiving unit, which is configured to realize downhole wireless signal transmission and reception.

The receiving apparatus realizes the downhole wireless signal transmission and reception through the receiving positive pole and the receiving negative pole of the receiving apparatus as well as the wireless short-transmission receiving unit.

Further, the electrical isolation drill collar includes a MWD connecting drill collar, a drill collar insulating sub, and a mud motor connecting drill collar; wherein the MWD connecting drill collar is connected to a drill collar provided with MWD, the mud motor connecting drill collar is connected to a mud motor; the MWD connecting drill collar and the mud motor connecting drill collar are made of a non-magnetic steel material, and the drill collar insulating sub is made of an insulating material, and both ends of the drill collar insulating sub are connected to the MWD connecting drill collar and the mud motor connecting drill collar by means of non-detachable threads, respectively to achieve electrical isolation.

Further, the internal electrical isolation short tube includes an upper joint, an inner tube insulating sub and a lower joint. The upper joint and the lower joint are made of metal, and the inner tube insulating sub is made of an insulating material, and both ends of the inner tube insulating sub are connected to the upper joint and the lower joint by means of non-detachable threads, respectively.

Further, the wireless short-transmission receiving unit includes a MWD adapter, a second compression-resistant outer tube, an adapter, a first connection bolt, a first electrical connection line, a receiving circuit sub, an electrical connector, a second connection line, a second connection bolt and a metal lantern stabilizer which are connected in turn.

One end of the receiving circuit sub is connected to the adapter through a first connection line and a first connection bolt penetrating through a second rubber shock absorber, and the adapter is connected to the second compression-resistant outer tube. The other end of the receiving circuit sub is connected to the metal lantern stabilizer through the electrical connector, the second connection line and the second connection bolt penetrating through an internal portion of the internal electrical isolation short tube.

Further, the MWD system (the upper suspension type MWD system or the lower seat key type MWD system) is connected to the MWD adapter through the MWD outer tube. An upper suspension apparatus of an upper suspension type MWD system or a lower seat key apparatus of a lower seat key type MWD system is connected to the MWD connecting drill collar of the receiving apparatus, and the metal lantern stabilizer is electrically connected to the mud motor connecting drill collar through a splayed metal wing. The upper suspension apparatus of the upper suspension type MWD system or the lower seat key apparatus of the lower seat key type MWD system can be replaced with a structure serially connecting the metal lantern stabilizer.

The second compression-resistant outer tube is electrically connected to the MWD outer tube through the MWD adapter, and the second compression-resistant outer tube is electrically connected to the MWD connecting drill collar through the upper suspension apparatus of the upper suspension type MWD system or the lower seat key apparatus of the lower seat key type MWD system, which is provided with the MWD outer tube; and a metal structure member is disposed between the MWD outer tube and the MWD connecting drill collar to ensure that the MWD system is installed inside the drill collar. When the structure installation is realized, the electrical connection between the MWD outer tube and the MWD connecting drill collar is achieved.

The first compression-resistant outer tube and the metal lantern stabilizer are electrically isolated by means of an internal electrical isolation short tube.

The MWD connecting drill collar and the drill collar connected to mud motor are electrically isolated by means of a drill collar insulating sub.

Further, one end of an external portion of the internal electrical isolating short tube is connected to the first compression-resistant outer tube by means of a thread and a sealing ring, and the other end of the external portion of the internal electric isolation short tube is connected to the metal lantern stabilizer by means of a thread and a sealing ring.

Further, the MWD adapter is electrically connected to the MWD outer tube, and the other end of an internal portion of the MWD adapter is connected to a battery sub through a first rubber shock absorber. One end of an internal portion of the adapter is flexibly connected to the battery sub by means of a guide hole and a shock-absorbing shim, and the other end of the internal portion of the adapter is connected to the receiving circuit sub through the second rubber shock absorber. A power line of the battery sub supplies a power to the receiving circuit sub and the whole receiving apparatus through the shock-absorbing shim, the adapter and the second rubber shock absorber.

One end of the internal portion of the MWD adapter is in data communication with the MWD by means of the electrical connector, the receiving circuit sub transmits data received by the receiving apparatus to the MWD system, and the data is transmitted to the ground via the MWD system.

Further, an external portion of the MWD adapter is connected to the second compression-resistant outer tube by means of a thread and a sealing ring. The second compression-resistant outer tube is connected to one end of an external portion of the adapter by means of a screw and a sealing ring, and the other end of the external portion of the adapter is connected to the first compression-resistant outer tube by means of a thread and a sealing ring.

Further, the receiving apparatus is of a probe-type structure that facilitates communication with the MWD.

In summary, the present disclosure provides a receiving apparatus suitable for near-bit wireless transmission, which adopts a receiving manner of the drill collar insulating sub and the inner tube insulating sub, that is, the insulating subs are connected in the middles of an electrical isolation drill collar and an internal electrical isolation short tube of the receiving apparatus, and based on the above design, the electrical isolation drill collar and the internal electrical isolation short tube of the receiving apparatus both have an electrical isolation function.

Further, the insulating subs in the electrical isolation drill collar and the internal electrical isolation short tube are non-detachable, and can meet downhole requirements for high torque and high-pressure sealing property.

Still, one end of the receiving apparatus of the present invention is electrically connected to the upper suspension apparatus of the upper suspension type MWD system or the lower seat key apparatus of the lower seat key type MWD system, and the other end of the receiving apparatus is electrically connected to the mud motor connecting drill collar by means of the splayed metal wing of the metal lantern stabilizer, so that the requirement for a precision of a nozzle inside the drill collar is reduced, the reliable electrical connection is realized, and an electrical connection structure of the lantern stabilizer does not affect the retrievability of the lower seat key type MWD system.

REFERENCE NUMBERS

1. MWD adapter; 2-1. first rubber shock absorber; 2-2. second rubber shock absorber; 3. battery sub; 4-1. first compression-resistant outer tube; 4-2. second compression-resistant outer tube; 5. adapter; 6. receiving circuit sub; 7. electrical isolation drill collar; 8. metal lantern stabilizer; 9-1. first connection bolt; 9-2. second connection bolt; 10. internal electrical isolation short tube; 11. MWD connecting drill collar; 12. drill collar insulating sub; 13. mud motor connecting drill collar; 14. first electrical connection line; 15. connector; 16. second electrical connection line; 17. upper joint; 18. inner tube insulating sub; 19. lower joint.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

Example 1

Figure 1:
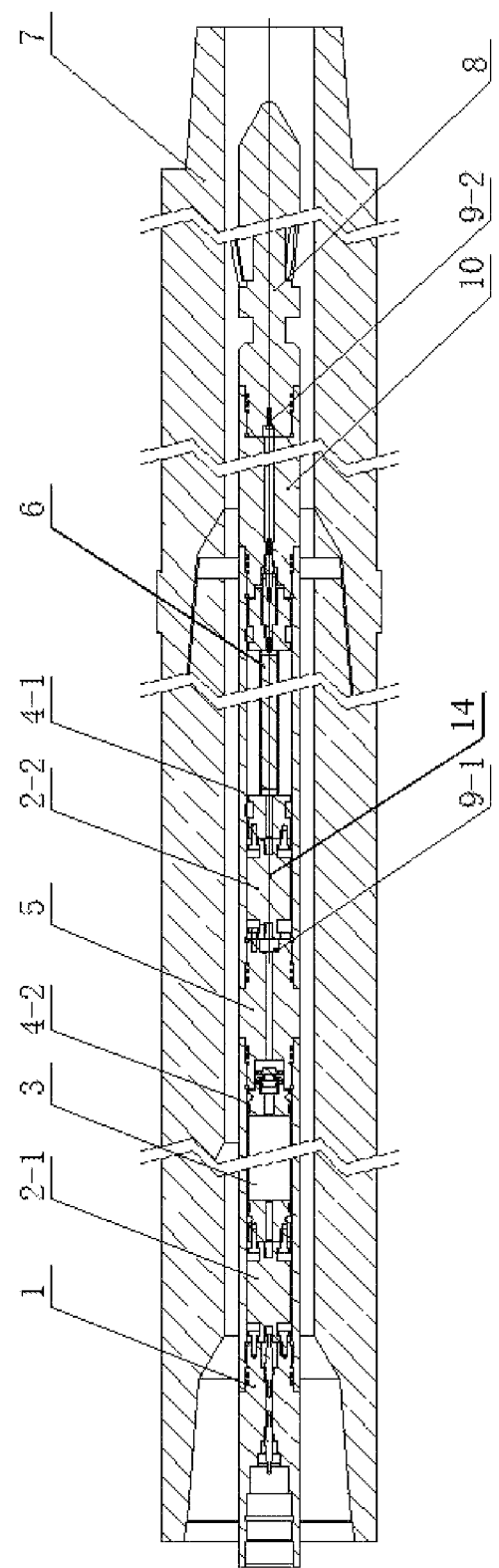
FIG. 1 is a schematic structural diagram of one embodiment of the receiving apparatus for downhole near-bit wireless transmission.

As shown in FIG. 1, a receiving apparatus for downhole near-bit wireless transmission includes an electrical isolation drill collar 7 and an internal electrical isolation short tube 10, wherein insulating subs are serially connected in the middles of the electrical isolation drill collar 7 and the internal electrical isolation sub 10 to realize electric isolation. The insulating subs separate the receiving apparatus into a receiving positive pole and a receiving negative pole, which are electrically isolated from each other. One end proximal to the MWD system is the receiving positive pole and one end proximal to a mud motor is the receiving negative pole. The electrical isolation drill collar 7 is electrically coupled with the internal electrical isolation sub 10.

The receiving apparatus further includes a wireless transmission receiving unit, which is configured to realize downhole wireless signal transmission and reception.

The receiving apparatus realizes downhole wireless signal transmission and reception through the receiving positive pole and the receiving negative pole of the receiving apparatus as well as the wireless transmission receiving unit. In particular, the receiving apparatus for near-bit wireless transmission of the present invention is matched with a transmitting apparatus for near-bit wireless transmission to realize wireless transmission of downhole parameters measured near the bit, wherein the transmitting apparatus for near-bit wireless transmission is configured to transmit an electromagnetic signal. Since a drilling fluid and the stratum are conductive, one part of the transmitted electromagnetic signal is returned to the data transmitting unit of the transmitting apparatus for near-bit wireless transmission through the mud motor connecting drill collar 13, and one part of the transmitted electromagnetic signal is transmitted to the wireless transmission receiving unit via the MWD connecting drill collar 11, and then returned to the data transmitting unit of the transmitting apparatus for near-bit wireless transmission via the mud motor connecting drill collar 13. Data received by the wireless transmission receiving unit is transmitted to the surface via the MWD system. The transmitting apparatus for near-bit wireless transmission may be a conventional electromagnetic signal transmitting apparatus in the art.

Figure 2:
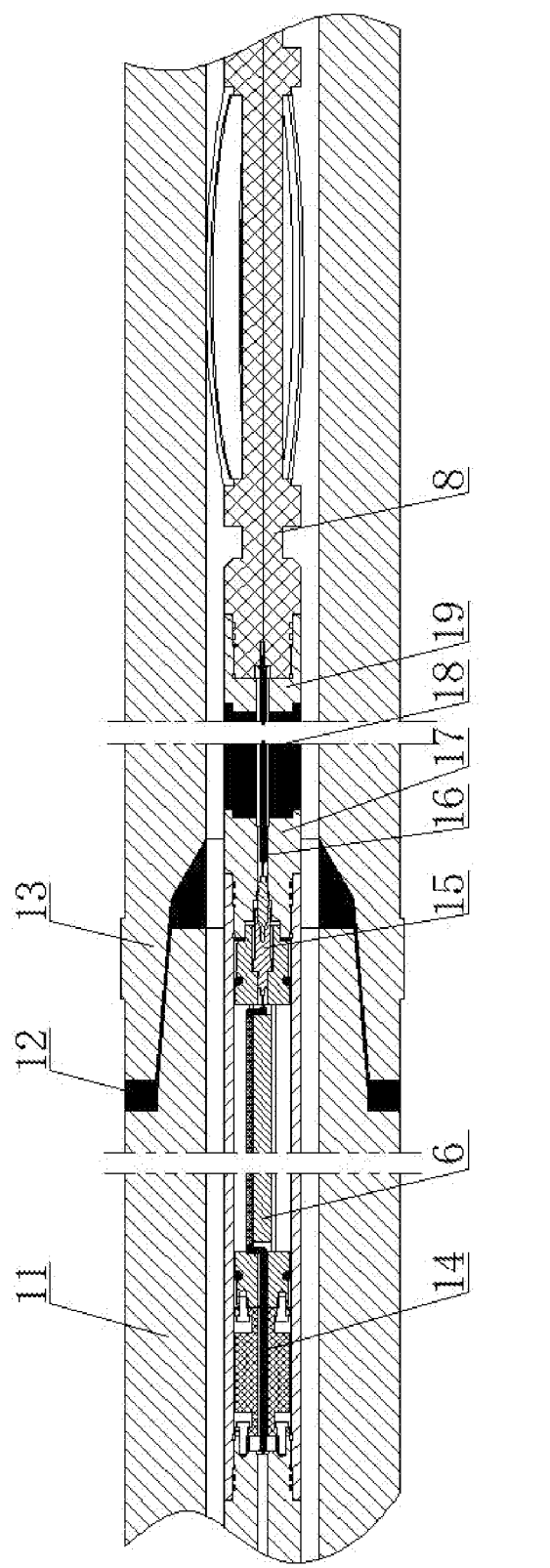
FIG. 2 is a schematic structural diagram of one embodiment of the wireless transmission receiving unit in a receiving apparatus for downhole near-bit wireless transmission.

As shown in FIG. 2, the electrical isolation drill collar 7 includes an MWD connecting drill collar 11, a drill collar insulating sub 12, and a mud motor connecting drill collar 13; wherein the MWD connecting drill collar 11 is connected to a drill collar provided with MWD by means of an API thread, the mud motor connecting drill collar 13 is connected to a mud motor by means of an API thread; the MWD connecting drill collar 11 and the mud motor connecting drill collar 13 are made of a non-magnetic steel material, and the drill collar insulating sub 12 is made of an insulating material, and both ends of the drill collar insulating sub 12 are connected to the MWD connecting drill collar 11 and the mud motor connecting drill collar 13 by means of non-detachable threads, respectively to achieve electrical isolation, accordingly, the drill collar insulating sub 12 meets downhole working requirements for high torsion and high-pressure sealing property.

The internal electrical isolation short tube 10 includes an upper joint 17, an inner tube insulating sub 18 and a lower joint 19; wherein the upper joint 17 and the lower joint 19 are made of a metal material, and the inner tube insulating sub 18 is made of an insulating material, and both ends of the inner tube insulating sub 18 are connected to the upper joint 17 and the lower joint 19 by means of non-detachable threads, respectively, and the inner tube insulating sub 18 meets downhole requirements for high-pressure sealing property and strength as well.

The wireless transmission receiving unit includes a MWD adapter 1, a second compression-resistant outer tube 4-2, an adapter 5, a first connection bolt 9-1, a first electrical connection line 14, a receiving circuit sub 6, an electrical connector 15, a second connection line 16, a second connection bolt 9-2 and a metal lantern stabilizer 8 which are connected in turn.

One end of the receiving circuit sub 6 is connected to the adapter 5 through a first connection line 14 and a first connection bolt 9-1 penetrating through a second rubber shock absorber 2-2, and the adapter 5 is connected to the MWD adapter 1 through the second compression-resistant outer tube 4-2. The other end of the receiving circuit sub 6 is connected to the metal lantern stabilizer 8 through the electrical connector 15, the second connection line 16 and the second connection bolt 9-2 penetrating through an internal portion of the internal electrical isolation short tube 10.

The MWD system (the upper suspension type MWD system or the lower seat key type MWD system) is connected to the MWD adapter 1 through the MWD outer tube.

An upper suspension apparatus of an upper suspension type MWD system or a lower seat key apparatus of a lower seat key type MWD system is connected to the MWD connecting drill collar 11 of the receiving apparatus, and the metal lantern stabilizer 8 is electrically connected with the mud motor connecting drill collar 13 through a splayed metal wing.

The second compression-resistant outer tube 4-2 is electrically connected to the MWD outer tube through the MWD adapter 1, and the second compression-resistant outer tube 4-2 is electrically connected to the MWD connecting drill collar 11 through the upper suspension apparatus of the upper suspension type MWD system or the lower seat key apparatus of the lower seat key type MWD system, which is provided with the MWD outer tube, a metal structure member is disposed between the MWD outer tube and the MWD connecting drill collar 11 to ensure that the MWD system is installed inside the drill collar. When the structure installation is realized, the electrical connection between the MWD outer tube and the MWD connecting drill collar 11 is achieved.

One end of an external portion of the internal electrical isolating short tube 10 is connected to the first compression-resistant outer tube 4-1 by means of a thread and a sealing ring, and the other end of the external portion of the internal electric isolation short tube 10 is connected to the metal lantern stabilizer 8 by means of a thread and a sealing ring.

The first compression-resistant outer tube 4 and the metal lantern stabilizer 8 are electrically isolated by means of an internal electrical isolation short tube 10. The MWD connecting drill collar 11 and the mud motor connecting drill collar 13 are electrically isolated by means of the drill collar insulating sub 12. An electromagnetic signal transmitted by a near-bit geology-oriented measurement transmitting system passes through a stratum, the MWD connecting drill collar 11, the MWD outer tube, the second compression-resistant outer tube 4-2, the adapter 5, the first connection bolt 9-1, the first electric connection line 14, the receiving circuit sub 6, the electric connector 15, the second connection line 16, the second connection bolt 9-2, the metal lantern stabilizer 8, the mud motor connecting drill collar 13 and the near-bit geology-oriented measurement transmitting system to form a loop, which realizes downhole wireless signal transmission and reception.

The MWD adapter 1 is electrically connected to the MWD outer tube, and the other end of an internal portion of the MWD adapter 1 is connected to a battery sub 3 through a first rubber shock absorber; one end of an internal portion of the adapter 5 is flexibly connected to the battery sub 3 by means of a guide hole and a shock-absorbing shim, and the other end of the internal portion of the adapter 5 is connected to the receiving circuit sub 6 by means through the second rubber shock absorber 2-2; a power line of the battery sub 3 supplies a power source to the receiving circuit sub 6 and the whole receiving apparatus through the shock-absorbing shim, the adapter 5 and the second rubber shock absorber. One end of the internal portion of the MWD adapter 1 is in data communication with the MWD by means of the electrical connector, the receiving circuit sub 6 transmits data received by the receiving apparatus to the MWD system, and the data received by the receiving apparatus of the present invention is transmitted to the ground via the MWD system.

An external portion of the MWD adapter 1 is connected to the second compression-resistant outer tube 4-2 by means of a thread and a sealing ring, and the second compression-resistant outer tube 4-2 is connected to one end of an external portion of the adapter 5 by means of a screw and a sealing ring, and the other end of the external portion of the adapter 5 is connected to the first compression-resistant outer tube 4 by means of a thread and a sealing ring.

The receiving apparatus is of a probe-type structure that facilitates communication with the MWD. An internal probe does not have a connection structure required to be detached from the drill collar, which facilitates data communication with the MWD, and meets a requirement for retrievability. The retrievability means that whole receiving apparatus may be pulled out from the ground together with the MWD system in a case of not pulling out of a wellbore. Due to a non-detachable connection structure of the receiving apparatus and the drill collar, there is no need for pulling out of the wellbore for detachment.

The invention claimed is:

1. A receiving apparatus for downhole near-bit wireless transmission, comprising a drill collar, a short tube disposed inside the drill collar, a drill collar insulating sub, an inner tube insulating sub, and a wireless transmission receiving unit, wherein the insulating subs electrically isolate the drill collar and the short tube from each other and to divide the receiving apparatus into a receiving positive pole and a receiving negative pole that are electrically isolated from each other, wherein the wireless transmission receiving unit comprises a MWD adapter, a second compression-resistant outer tube, an adapter, a first connection bolt, a first electrical connection line, a receiving circuit sub, an electrical connector, a second connection line, a second connection bolt, and a metal lantern stabilizer, wherein the first connection line and the first connection bolt form a passage through a second rubber shock absorber and electrically connect a first end of the receiving circuit sub with the adapter, and the adapter is connected with the MWD adapter through the second compression-resistant outer tube, and wherein the electrical connector, the second connection line, and the second connection bolt extend form a passage through the short tube, and connect the second end of the receiving circuit sub with the metal lantern stabilizer.

2. The receiving apparatus according to claim 1, wherein the drill collar comprises a MWD connecting drill collar, the drill collar insulating sub having a first end and a second end, and a mud motor connecting drill collar, wherein the MWD connecting drill collar and the mud motor connecting drill collar are made of a non-magnetic steel material, and the drill collar insulating sub is made of an insulation material, and a first end of the drill collar insulating sub is connected with the MWD connecting drill collar and the second end of the drill collar insulating sub is connected with the mud motor connecting drill collar.

3. The receiving apparatus according to claim 2, wherein the short tube comprises an upper joint, the inner tube insulating sub having a first end and a second end, and a lower joint; wherein the upper joint and the lower joint are made of a metallic material, and the inner tube insulating sub is made of an insulation material, and the first end of the inner tube insulating sub is connected with the upper joint and the second end of the inner tube insulating sub is connected with the lower joint.

4. The receiving apparatus according to claim 2, wherein the metal lantern stabilizer is electrically connected with the mud motor connecting drill collar through a splayed metal wing.

5. The receiving apparatus according to claim 1, wherein one end of an external portion of the short tube is connected with the first compression-resistant outer tube, and the other end of the external portion of the short tube is connected with the metal lantern stabilizer.

6. The receiving apparatus according to claim 1, wherein the MWD adapter is electrically connected with a MWD outer tube, and a first end of an internal portion of the MWD adapter is connected with a battery sub through a first rubber shock absorber; a first end of an internal portion of the adapter is flexibly connected with the battery sub through a guide hole and a shock-absorbing shim, and a second end of the internal portion of the adapter is connected with the receiving circuit sub through the second rubber shock absorber; a power line extends through the shock-absorbing shim, the adapter, and the second rubber shock absorber and connects the battery sub with the receiving circuit sub.

7. The receiving apparatus according to claim 6, wherein an external portion of the MWD adapter is connected with the second compression-resistant outer tube, and the second compression-resistant outer tube is connected with a first end of an external portion of the adapter, and the second end of the external portion of the adapter is connected with the first compression-resistant outer tube.

8. The receiving apparatus according to claim 1, wherein the receiving apparatus is of a probe-type structure that facilitates communication with the MWD.

\* \* \* \* \*